July 20, 1943.  W. J. SECREST  2,324,987
CONTROL SYSTEM
Filed Aug. 4, 1940  2 Sheets-Sheet 1
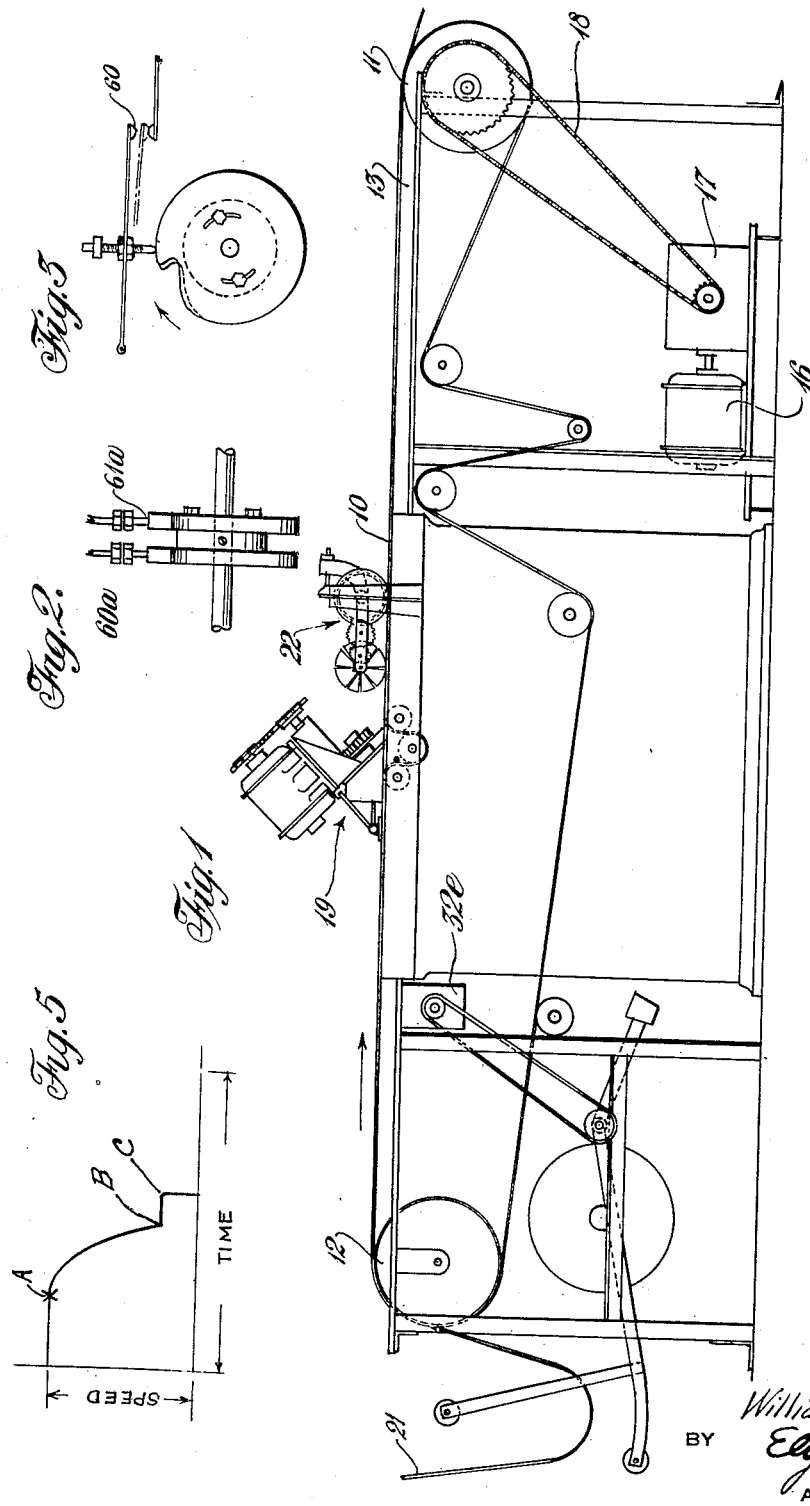
INVENTOR
William J. Secrest
BY Ely & Frye
ATTORNEYS July 20, 1943.  W. J. SECREST  2,324,987
CONTROL SYSTEM
Filed Aug. 4, 1940  2 Sheets-Sheet 2
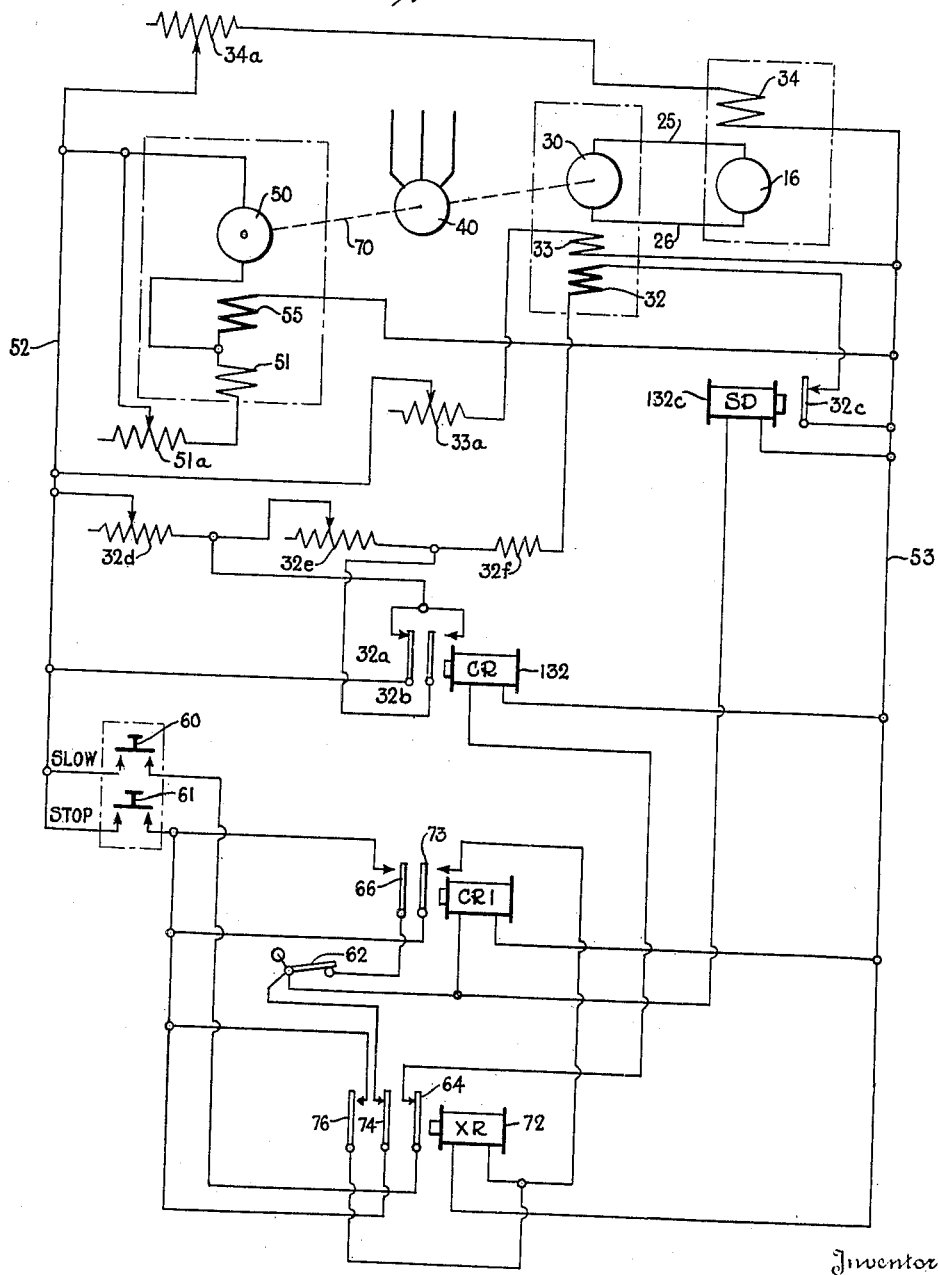
Inventor
WILLIAM J. SECREST
By Ely & Frye
Attorneys Patented July 20, 1943

2,324,987

UNITED STATES PATENT OFFICE 2,324,987

CONTROL SYSTEM

William J. Secrest, Cuyahoga Falls, Ohio, assignor to The Firestone Tire & Rubber Company, Akron, Ohio, a corporation of Ohio Application August 4, 1940, Serial No. 351,293

1 Claim. (Cl. 172—239)

This invention relates to a control system for controlling the speed and intermittent starting and stopping of a direct current motor. More particularly, the invention provides an electrical control system for stopping a machine operated by an electric motor at predetermined points within very small tolerances.

Accordingly, a major object of the invention is to provide an electrical control system for uniformly stopping a direct current motor at successive predetermined points.

Another object is to provide a method and means for controlling the stopping of a direct current motor by first reducing the voltage applied to the motor until the motor has reached a constant lowered speed and thereafter applying regenerative braking to stop the motor at a predetermined point.

Also, it is an object to provide a control system capable of producing very great deceleration of the motor and to control the stopping of the motor within a uniform time after the control is set into operation.

Other and further objects of the invention will readily appear from the following description, taken in connection with the accompanying drawings, in which:

Figure 1 is a schematic view of a machine for automatically cutting tread blanks for pneumatic tires to which the present invention is applied for the purposes of illustration;

Figure 2 is a partial detail view showing the cams on the part driven by the electric motor which operates the electrical control;

Figure 3 is a side elevation of the structure shown in Figure 2;

Figure 4 is a schematic wiring diagram of the control system for the motor; and

Figure 5 is a time-speed graph illustrating the manner in which the control system functions.

For the purpose of illustration, the invention is shown as applied to an apparatus for automatically cutting tread blanks for pneumatic tires into uniform lengths. Generally speaking, this apparatus comprises a conveyor belt 10 which passes over a plurality of end rollers 11 and 12, and a series of intermediate rollers which control the slack in the conveyor belt. The rollers are suitably journaled on the frame 13. The general construction of the tread cutting apparatus is similar to that shown in Stevens Patent No. 1,819,991, issued August 18, 1931, except that the patented construction has an intermittent mechanical drive for the conveyor belt, while the construction illustrated utilizes an electric motor control in accordance with the present invention. The end roller 11 is the driving roller for the conveyor belt 10 and is driven by a direct current motor 16 through the agency of a suitable gear reducing mechanism 17 and chain and sprocket assembly 18. A suitable tread cutting apparatus 19 of the general type shown in the aforesaid patent is provided adjacent the upper reach of the conveyor belt 10 and is intermittently operated in timed relation with the starting and stopping of the conveyor belt to sever the tread blank 21 into a plurality of sections. The continuous tread blank 21 is carried forward, to the right in Figure 1, on the conveyor belt 10 and at predetermined intervals, determined by a measuring device 22, also of the general type as that shown in the aforesaid patent, the motor 16, and consequently the conveyor belt and tread blank 21, are stopped while the cutting apparatus 19 moves transversely of the conveyor belt to sever a portion of the tread blank.

The transverse movement of the cutting apparatus may be controlled by any conventional means in timed relation to the intermittent movement of the conveyor belt 10, through the agency of a control initiated by the stopping of the conveyor belt. The cycle is completed as the cutting apparatus moves to its inoperative position. As the latter returns to this inoperative position its movement initiates a control of the motor 16 to again advance the conveyor belt 10 to the right, as shown in Figure 1.

The gist of the present invention resides in the method and means for controlling the motor 16 in such a manner that the conveyor will always be stopped at substantially equally successive points within very small tolerances, in order that all of the tread blank 21 will be cut into shorter units of substantially equal length.

Fundamentally, the present invention comprises novel means and method for controlling the source of the electrical supply to the motor 16 in such a manner as to obtain this accurate and uniform stopping of the motor. This is accomplished by controlling the power source so that the voltage of the latter is first reduced with the motor 16 still connected to the source, until the motor decelerates to a lower constant speed, and then so regulating the source that its voltage is lower than the generated back electromotive force in the generator to produce very high and accurately controlled deceleration of the motor, the novelty residing in the combination of the steps of lowering the voltage of the source to reduce the speed of the motor and then not effecting further control of the energy input until the motor has ceased to decelerate and has reached a lowered constant speed, after which further stopping control is applied to obtain a degree of accuracy in stopping not heretofore feasible with direct current motors.

Referring to Figure 4, the source of direct current is the generator 30, which is driven at substantially constant speed by any suitable source of power, such as an alternating current motor 40, the motor 16 being connected directly across the output of the generator 30 through means of the conductors 25 and 26. The generator 30, the altering current motor 40, and a direct current exciter 50 to supply the excitation to the generator 30 and the motor 16, are coupled together by a common drive, such as a shaft, indicated by the dotted line 70. The exciter 50 is excited by the shunt field 51 and the series field 55 connected to the output conductors 52 and 53, the voltage of which is controlled by variable resistor 51a. The generator 30 is provided with a plurality of shunt field windings 32 and 33. The field windings 32 and 33 are so connected that their magnetic fields are opposed to each other. The respective resistances in the circuits of the various field windings are such that under normal conditions the normal operating voltage will be impressed across the input of the motor 16 with the field winding 32 supplying the dominating magnetic flux. The stopping control comprises means to regulate the field windings of the generator 30 so that the generator voltage is first reduced to a lower value of operating voltage and subsequently after a time interval sufficient to permit the deceleration of the motor to reach zero as a result of the reduced voltage, the connection of the field winding is varied so that the voltage of the generator 30 is reduced to substantially zero, at which time the very low resistance of the armature winding of the generator 30 provides the dynamic braking action to the motor 16. If desirable, the resultant field of the generator 30 can be controlled so as to reverse the voltage in order to obtain a higher deceleration of the motor 16.

To this end, as is shown, the field winding 32 supplies the dominant excitation for the generator 30, while the differential field winding 33 opposes the flux of the winding 32. The energization of field winding 32 is controlled by relays 32a, 32b, and 32c, and resistors 32d, 32e, and 32f. The resistor 32d has fixed taps which may be used for regulating the proper desired normal operating voltage of the generator 30. The resistor 32e is variable and may be controlled automatically or manually to vary the operation of the motor within small limits. This resistor may be automatically controlled by the movement of the tread blank 21 before it reaches the conveyor 10 by means of arms controlled by the loop in the tread blank at the left of Figure 1. The resistor 32f is a fixed limit resistor to control the maximum current through the field winding 32. The resistor 33a is in series with the shunt field winding 33 and has a plurality of fixed taps to vary the current through the winding 33. The resistor 34a is in series with the field winding 34 of the motor 16 and the resistor has a plurality of adjustable taps which may be varied in relation to the resistors 33a, 32d, and 32e to effect the desired operating voltage of the generator 30 and speed of the motor 16. Ordinarily, after the resistors 32d, 33a, and 34a are adjusted, they will not need to be changed unless it is desired to adjust the degree of deceleration of the motor 16 when stopping. It is to be understood that a change in the load on the motor 16 will vary the deceleration.

The relays 32a and 32b, and the resistors 32d and 32e are in a bridge circuit in series with the field winding 32 and are so arranged that when relay 32a is closed and 32b is open, the energization of the field winding 32 is such that when combined with the magnetic fields of the winding 33 the normal operating voltage of the generator 30 will be developed. When the relay 32a is open and the relay 32b is closed, the resistor 32d will be connected in series with the field winding 32 and the resistor 32e will be cut out of the circuit. The resistance of resistor 32d is more than that of resistor 32e so that the voltage of the generator 30 will be reduced to substantially one-fourth its normal operating value. The relay 32c controls the opening and the closing of the circuit of field winding 32. When the relay 32c is open and the field winding 32 is open, the resultant field of winding 33 is such that the generated voltage is reduced to zero and a slight voltage in the opposite direction is built up to oppose the generated back electromotive force in the armature of the motor 16. Since there is no substantial voltage generated in the armature of the generator 30 which is counter to the voltage generated in the motor 16, the low resistance of the armature of the generator 30 serves as a short circuit to the armature of the motor 16 to produce dynamic braking. It is within the scope of this invention to so control the fields that when winding 32 is de-energized the generator voltage will go to zero, but a slight reversal of the voltage produces faster deceleration of the motor 16.

When the above-described control is applied to the tread cutter, as shown, the control of the field windings is accomplished by cam operated circuit contactors 60 and 61 which are operated by cam 60a and 61a, respectively, of the measuring device 22, and a limit switch 62, which is operated by the transverse movement of the cutting apparatus 19. The circuit contactors 61 and 62, respectively, effect the steps of reducing the generated voltage of the generator 30 and the reversal of the generator voltage during the final stages of the stopping of the motor 16. The limit switch 62, which is opened by the final movement of the cutting apparatus 19 to the inoperative position, effects the closing of relay 32c, which causes the generator voltage 30 to again build up to the normal operating value and the motor 16 to build up to normal operating speed.

The contacts 60 are in series with relay contacts 64, which are normally closed, and the holding coil 132 which controls relay contacts 32a and 32b. Relay contacts 32a are normally closed, while those of 32b are normally open. Contacts 61 are in series with the normally open relay contacts 66, normally closed limit switch 62, and holding coil 132c. The holding coil 132c controls relay contacts 32c. A relay holding coil 71 that controls the relay contacts 71a of any desired external control circuit is in parallel with the holding coil 132c. This same relay coil also controls contacts 66 and 73.

In order to provide an electrical interlock to keep the motor 16 stopped until the cutting apparatus 19 has completed its transverse cutting movement and opens limit switch 62, a relay holding coil 72 is provided in series with the stop contacts 61 and relay contacts 73. The holding coil 72 controls the contacts 74 which are in parallel with the contacts 66 and the contacts 76 which are in parallel with the contacts 73. The coil also controls contacts 64.

In the operation of the control stop as applied for illustrative purposes, it will be assumed that the motor 16 is operated to drive the conveyor belt so that the upper reach of the belt is moving to the right in Figure 1. In the drawings the contacts, which are normally closed during the normal operation of the motor, are indicated by diagonal broken lines across the contacts. As the cam 60a, operated by the measuring device 22, closes contacts 60, a circuit through the holding coil 132 is closed. The energization of this holding coil 132 opens contacts 32a, which are normally closed, and at the same time closes contacts 32b, which are normally open, so that the field winding 32 is energized through the circuit including resistor 32d, contact 32b, limit resistor 32f, and the contacts 32c which are also normally closed. The resistance of the resistor 32d is greater than that of resistor 32e, so that the energization of the holding coil 132 reduces the output voltage of the generator 30 and consequently reduces the speed of the motor 16. The moment at which the resistor 32e is cut out of the energization circuit of the field winding 32 and resistor 32d is cut into the circuit to reduce the voltage is indicated by point A on Figure 5. As indicated in Figure 5, this will cause the deceleration of the motor 16 down to a lower speed indicated at point B of Figure 5. It will be readily understood that between the points A and B the motor is decelerating very rapidly. As soon as the deceleration of the motor has been reduced to zero and the motor is then operating at a reduced constant speed, which will be indicated by the straight line to the right of point B, the electrical braking action on the motor 16 may be applied in accordance with this invention to bring the motor to a predetermined controlled stop within very small tolerances. The cams 60a and 61a of the measuring device are so adjusted relative to each other that the contacts 61 are closed as soon as practicable after the motor 16 has decelerated to a constant lower speed, such as the point indicated at C of Figure 5. The closing of the contacts 61 completes the circuit through the normally closed contacts 74, the limit switch 62, and the holding coil 132c, which opens the contacts 32c. The instant that the field winding 32 is de-energized, the differential field winding 33 reverses the magnetic flux of the generator field and reverses the output voltage of the generator. Depending upon the load on motor 16, it may be feasible to vary the relative energization of the fields 32 and 33 such that when the field 32 is cut out the generator voltage will pass through zero, but will not build up sufficiently to reverse the operation of the motor. With the circuits in the condition just described, the voltage of the generator 30 will be prevented from building up to a value and starting the motor 16 in opposite direction. If desired, the energization of the holding coil 71 may be used to close the contacts 71a, which may be in the control circuit of the motor, which will operate the cutting apparatus 19 to move it transversely across the tread blank to cut the latter. As the cutting apparatus completes its transverse movement to the inoperative position, it may operate the limit switch 62 to open the circuit through holding coils 71 and 132c. As soon as holding coil 132c is de-energized, the contacts 32c will close. Also, when holding coil 71 is deenergized, contacts 74 will close and at the same time contacts 71a will again be opened. Since the closing of the contacts 61 effects the closing of contacts 73, the holding coil 72 will be energized to open contacts 64 and 74 and close contacts 76. Therefore, as the cutting apparatus moves past the limit switch, which it holds open only momentarily, the circuit through the holding coil 132 will be de-energized so that contacts 32a will be closed and contacts 32b will be opened. This places the circuit again in condition for normal operation and the voltage of the generator 30 will immediately build up and start the operation of the motor 16. This cycle will again be repeated, as soon the tread blank has moved the right amount to again operate the contacts 60 and 61 through the agency of the cams 60a and 61a.

If desired, the final step of stopping the motor 16 can be accomplished, after the motor has decelerated to a constant speed, by opening the generator-motor circuit and connecting a braking resistor directly across the terminals of the motor 16. This can be accomplished in a conventional manner or by relay contacts controlled by the holding coil 132c.

The control system described and claimed herein may be applied to any apparatus which it is desired to intermittently operate and stop at uniform and definite time intervals within very small tolerances. For instance, in addition to the installation shown, the control may be applied to bias cutters for tire carcass stock, or to butt-splicing machines or any like apparatus where it is absolutely necessary that the apparatus always stop at uniform time intervals or points of travel of parts of the mechanism.

Although the foregoing has been more or less specific by way of illustration and not by way of limitation, it is to be understood that the present application has many other applications than that shown here. It will also be readily apparent that the mechanical or electrical equivalent of element shown here may be substituted without departing from the spirit or scope of the invention.

What is claimed is:

Direct current apparatus having in combination, a generator and a motor adapted to be normally driven by said generator, conveyor means driven by the motor, a resistance for reducing the generator field current, switch means responsive to the operation of the conveyor at predetermined points in the travel thereof for connecting the resistance to the generator field, said switch means being adapted to open the generator field and permit the generator voltage to drop to zero at a point of conveyor travel spaced from the resistance cut-in point, and means for neutralizing regenerative action in the motor generator circuit after the generator field is opened to insure said drop to zero, said means comprising a differential generator field in which opposition currents are induced.

WILLIAM J. SECREST.